Jan. 27. 1925.　　　　　　　　　　　　　　　1,524,360
A. LAURITZEN
POTATO DIGGER GRID
Filed May 19, 1924　　　　　2 Sheets-Sheet 1
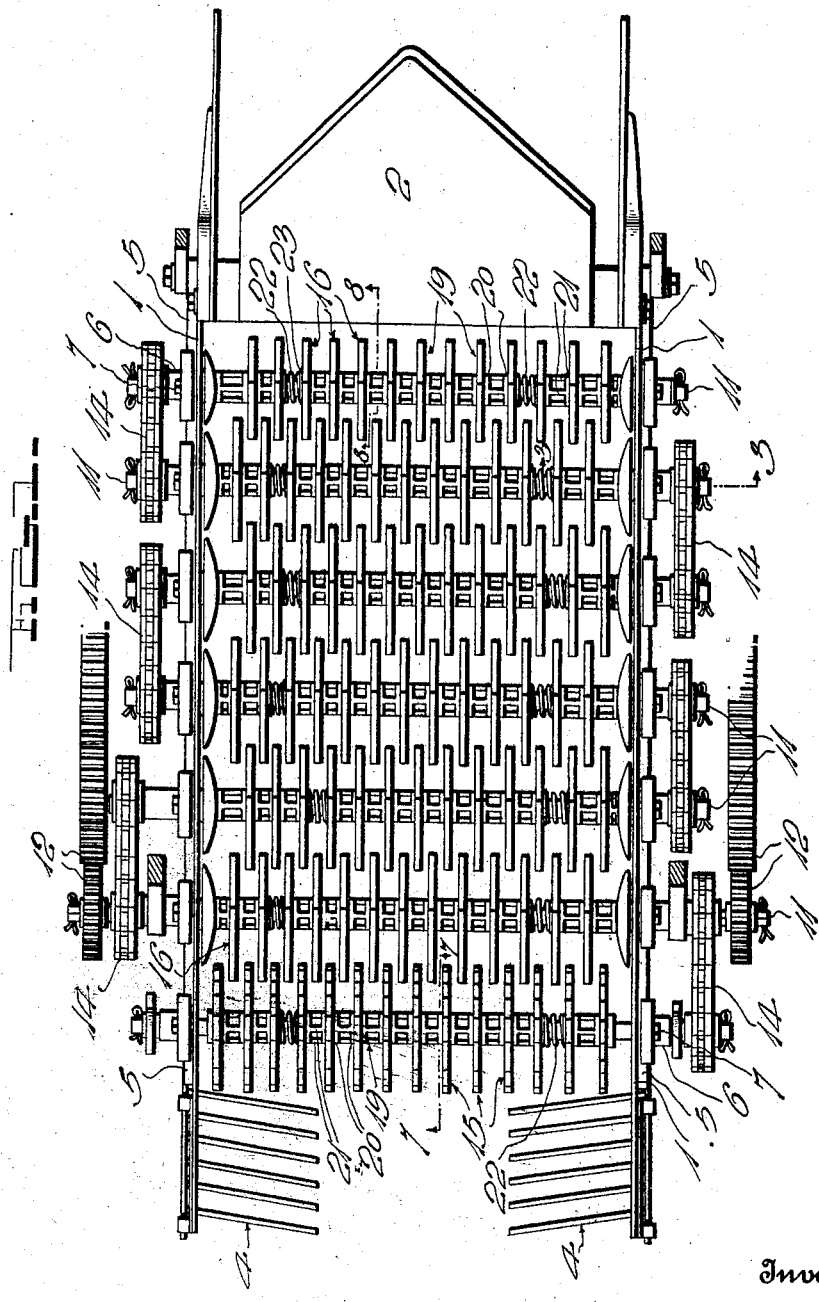
Inventor
A. Lauritzen
Witness
H. Woodard

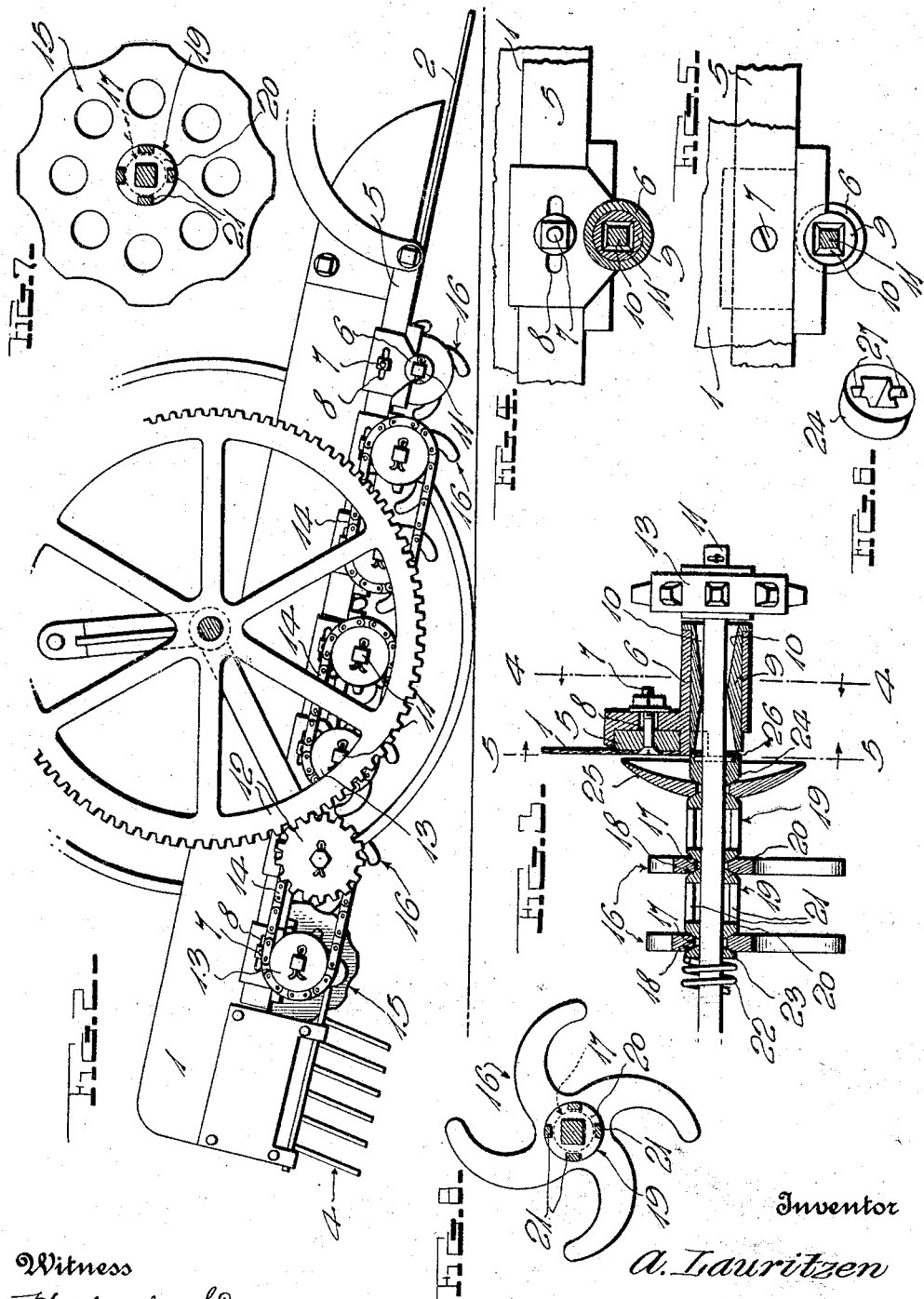
Jan. 27, 1925.  
A. LAURITZEN  
POTATO DIGGER GRID  
Filed May 19, 1924  
1,524,360  
2 Sheets-Sheet 2

Patented Jan. 27, 1925.

1,524,360

UNITED STATES PATENT OFFICE.

ALBERT LAURITZEN, OF CHARLOTTE, MICHIGAN.

POTATO-DIGGER GRID.

Application filed May 19, 1924. Serial No. 714,438.

*To all whom it may concern:*

Be it known that I, ALBERT LAURITZEN, a citizen of the United States, residing at Charlotte, in the county of Eaton and State of Michigan, have invented certain new and useful Improvements in Potato-Digger Grids; and I do declare the following to be a full, clear, and exact description of the invention, such as will enable others skilled in the art to which it appertains to make and use the same.

This invention relates to new and useful improvements in the separators or grids used on potato diggers of the type illustrated in U. S. Patents 1014493, 1239921, 1239922 and 1261139. In these prior patents, the grid comprises a pair of parallel side members, a plurality of transverse driven shafts extending between said members, bearings for the shafts adjustable toward and from each other to adjust driving chains used therefor, agitating members on the shafts, spacing collars on said shafts between most of the agitating members, and compression springs between the remainder of said agitating members, exerting pressure to frictionally hold the collars and agitators together and cause rotation thereof bodily with the shafts, while permitting any of the agitators to idle, if it should come in contact with a stone or the like, passing over the grid.

While a grid of the type above referred to, is rather efficient, it possesses certain features which are open to improvement. For instance, the endmost agitating members on the shafts are not disposed in substantial contact with the side plates of the grid, at both ends of said shafts, which often permits stones to jam between certain of said agitators and the side plates and also permits the earth moved rearwardly by the grid to frictionally bind against said side plates. It is one object of the invention to equip the shafts with disks at both ends, which disks prevent an appreciable amount of the earth from coming in contact with the side plates. Furthermore, these disks are so shaped and related with the side plates as to immediately discharge any soil or pieces of stone which may by any possibility enter between them and said side plates.

Another rather objectionable part of the old grid, is that the agitating members contact with the polysided shafts which drive them, and when any of said members are held against rotation and the shafts turn within them, the members are prone to cut grooves in the shafts, and these grooves prevent the springs on the shafts from properly binding the spacing collars and agitating members together, as said members are held to some extent against axial movement, by the grooves. It is therefore another object of the invention to provide the spacing collars and agitating members with co-acting means whereby said members are held centered upon the shafts but cannot come in contact therewith to injure the same.

In the old machines, fine dirt very often finds its way to the insides of the spacing collars and so packs therein as to also be a factor in preventing free movement of the collars and agitating members, under the action of the springs which are intended to hold them in frictional contact. I have found that it is practically impossible to prevent the fine dirt from packing into these collars and hence, another aim of the present invention is to so construct the collars as to permit any dirt which does enter them to immediately leave, so that it cannot cause trouble as heretofore.

When adjusting the shaft bearings of the old machines, to tighten the driving chains for the shafts, the latter are caused to bind to some extent in said bearings. A further object of the present invention however, is to provide a novel association and construction of sleeves rotatable with the shafts and in turn rotatable within the bearings, said sleeves permitting uninterrupted rotation of the shafts even though they may be angled to quite an appreciable extent, with respect to the bearing axes.

A still further obpect of the invention is to provide novel thrust collars at the ends of the shafts to limit the movement of the agitating members, spacing collars and disks, under the influence of the springs, said thrust collars being secured upon the shafts in a novel manner.

With the foregoing in view, the invention resides in the novel subject matter hereinafter described and claimed, the description being supplemented by the accompanying drawings.

Figure 1 is a plan view showing the improved grid.

Figure 2 is a side elevation partly in section showing the grid and parts of its supporting and driving means.

Figure 3 is a vertical transverse sectional view as indicated by line 3—3 of Fig. 1.

Figures 4 and 5 are detail vertical sections as indicated by lines 4—4 and 5—5 of Fig. 3.

Figure 6 is a detail perspective view of one of the thrust collars employed at the ends of the shafts to limit the movement of the agitating members, spacing collars and disks, under the influence of the springs.

Figures 7 and 8 are detail sectional views as indicated by lines 7—7 and 8—8 of Fig. 1.

In the drawings above briefly described, the numerals 1 designate the parallel side plates of the grid, at the front ends of which is located the plow 2, oscillatory shakers 4 being shown at the rear ends of said plates. Longitudinal bars 5 have been shown extending along the lower edge portions of the side plates 1, at the outer sides of the latter, and shaft bearings 6 are adjustably secured to these bars by bolts 7 and slots 8. Rotatable freely within the bearings 6, are sleeves 9 having polysided interiors 10 which increase in diameter from their centers to their ends. Transverse shafts 11 pass through the sleeves 9 and are polysided to engage the latter at their centers, so that the sleeves rotate with the shafts and cooperate with the bearings 6 in rotatably supporting the latter. One of the shafts 11 is driven by gearing 12 from the wheels of the potato digger with which the grid is used; and I provide sprockets 13 and chains 14 for driving said shafts one from another, the chains being located alternately at opposite sides of the grid. Loosening of the bolts 7 permits adjustment of the shafts 11, to take up slack in the chains 14 and while such adjustment angles the shafts with respect to the axes of the bearings 6 and sleeves 9, the internally flared ends of said sleeves permit such angling of the shafts without causing the sleeves and bearings to frictionally bind against each other.

Agitating members are located on all of the shafts 11, at spaced points. The agitating members for the rear shaft are preferably of the shape shown in Fig. 7 and are indicated at 15. The others however, may be of the shape detailed in Fig. 8 and they are designated in the drawings by the character 16. All of these agitating members have shaft-receiving openings 17 which are of greater diameter than the diameter of the shafts, and opposite sides of said members are formed with shallow, concave, countersinks 18. Spacing collars 19 are interposed between most of the agitating members and each of these collars preferably comprises two end rings 20 having convex outer sides snugly engaging the countersinks 18, and a plurality of spaced posts 21 which extend between and are integrally joined to said end rings. The openings in the end rings 20 are of a size to snugly fit the shafts 11, yet to have any necessary amount of sliding motion thereon, but the posts 21 are spaced radially outward from these openings so that space is provided between them and said shafts. Thus, any dirt finding its way into the collars may immediately leave between the spaces which exist, both between the shafts and the posts 21, and between said posts. Furthermore, the convex sides of the rings 20, seated within the countersinks 18, hold the agitating members 15 and 16 centered upon the shafts so that they cannot drag upon the latter with the injurious results above set forth.

I have stated above that the collars 19 are interposed between most of the agitating members. Between the remaining agitating members, coiled springs 22 are located, and these springs act oppositely against small collars or washers 23 which are shaped to fit the adjacent countersinks 18. The springs 22 force the agitating members and collars in a direction to cause frictional contact between them, so that the collars act as drivers for the agitating members, as well as holding them centered upon the shafts.

It will be seen from the drawings, that certain of the collars 19 are disposed at the outer sides of the outermost agitating members 16, and that thrust collars 24 are mounted on the shafts at the inner ends of the bearings 6. Furthermore, a plurality of concavo-convex disks 25 will be observed, disposed at the inner sides of the plates 1 and held frictionally between the outermost collars 19 and the collars 24, these collars and the opposed sides of the disks being shaped in the same manner as the corresponding surfaces of the agitating members and the other collars. It will be noted that the concave sides of the disks 25 are disposed toward the plates 1, that the edge portions of said disks are substantially in contact with said plates, and that these disks extend below the plates. Thus, any earth and pieces of stone which may possibly enter between the plates and disks, will immediately drop entirely through to the space beneath the machine. Moreover, the arrangement of disks is such that they substantially prevent dragging of the rearwardly moving earth, against the side plates 1, and hence, they avoid a great deal of friction which existed in the old machines.

By considering Figs. 3 and 6, the preferred manner of securing the thrust collars 24 on the shafts 11, will be understood. It will be seen from these views, that at each end of each shaft, a pin 26 passes through said shaft, at the outer side of the adjacent collar 24, said collar being formed with recesses 27 to receive the pin ends. The outer ends of these recesses constitute shoulders which abut the ends of the pins and thus prevent them from moving out of the shaft openings. However, when the disks, collars and agitating members are forced inwardly along the shafts, against the action of the springs 22, it will be seen that the pins 26 may be removed, permitting any or all of the elements on the shafts to be withdrawn. This is of course done only when the machine is being totally or partially disassembled, for instance, when making repairs.

To summarize the improvements above described, I may direct attention to the novel form of bearing sleeves 9 for the shafts 11, the provision of the disks 25, the novel mounting of the collars 24, the unique construction of the spacing collars 19, and the co-acting concave and convex surfaces on the agitating members and collars, and on the disks and collars, these several improvements having the advantages previously pointed out.

As excellent results are obtainable from the exact details described, they are preferably followed, but within the scope of the invention as claimed, modifications may of course be made.

I claim:

1. In a potato digger grid having a pair of parallel side plates and transverse rotary agitators extending between said plates; disks mounted on both ends of said agitators at the inner sides of the plates and extending below said plates, said disks having concave sides whose edge portions are disposed substantially in contact with said plates.

2. In a potato digger grid having a pair of parallel side plates and transverse rotary agitators extending between said plates; concavo-convex disks mounted on both ends of said agitators at the inner sides of said plates and extending below the latter, said disks having their concave sides disposed toward the plates and having the peripheral portions of said concave sides substantially in contact with said plates.

3. In a potato digger grid having a pair of side members and transverse driven shafts extending between them, agitating members spaced apart longitudinally of said shafts and having openings receiving the same, said openings being of greater diameter than the shafts, spacing collars contacting with the shafts between most of said agitating members, compression springs between the other agitating members, and means at the ends of the shafts limiting the movement of the collars and agitating members under the influence of the springs; said collars and agitating members having co-acting means retaining the agitating members in centered position on the shafts to prevent them from contacting with and wearing grooves in the latter.

4. In a potato digger grid having a pair of side members and transverse driven shafts extending between them, agitating members spaced apart longitudinally of said shafts and having openings receiving the same, said openings being of greater diameter than the shafts, said agitating members being countersunk at the ends of the openings, spacing collars contacting with the shafts between most of said agitating members and having convex ends engaging the countersinks thereof to hold said members in centered position and prevent them from contacting with the shafts, compression springs on the shafts between the other agitating members, washers between the springs and the adjacent agitating members, said washers contacting with the shafts and having convex sides engaging the countersinks of said adjacent agitating members, and means for limiting the movement of the agitating members and collars under the influence of said springs.

5. In a potato digger grid, a pair of side members, transverse driven shafts extending between said side members, and agitating members spaced apart longitudinally of said shafts and having central countersinks, spacing collars on the shafts between said agitating members, each collar consisting of two end rings having convex outer sides received in said countersinks, and a plurality of spaced posts whose ends join said rings, said rings having openings to snugly receive the shafts and said posts being spaced radially outward from said openings to space them from the shafts, spring means holding the collars and agitating members in frictional contact with each other, and means limiting the movement of said agitating members and collars under the influence of said spring means.

6. In a potato digger grid having a pair of side members, transverse driven shafts extending between them, agitating members on the shafts, spacing collars between most of said agitating members, compression springs between the remainder of said agitating members frictionally holding said collars and agitating members in engagement with each other and exerting force thereon toward the ends of the shafts, thrust collars on the ends of the shafts, and pins passing through openings in said shafts at the outer sides of said thrust collars to hold the latter against outward movement, said thrust collars having shoulders abutting the ends of the pins to retain them in the shaft openings until said thrust collars are forced inwardly on the shafts to a predetermined extent.

7. In a potato digger grid having a pair of side plates, transverse driven shafts extending between said side plates, agitating members at spaced points on said shafts, concavo-convex disks on the ends of the shafts at the inner sides of said side plates with their concave sides disposed toward said plates, opposed sides of said disks and members having concave countersinks, spacing collars between most of said members and between the endmost members and said disks, said collars having convex ends engaging the countersinks of said members and disks, spring means between the remaining members exerting force thereon toward the ends of the shafts, pins passing through openings in the shafts spaced outwardly from the disks, and thrust collars on the shafts between said pins and disks, said thrust collars having convex inner sides engaging the outer countersinks of said disks and having shoulders at their outer sides abutting the ends of said pins.

8. A structure as specified in claim 7; each of said spacing collars consisting of two end rings and spaced posts extending between and joined to said rings in outwardly spaced relation with the inner edges of said rings.

9. In a potato digger grid having a pair of side members, spaced transverse bearings mounted on said side members and adjustable toward and from each other, transverse agitators between said side member having non-circular shafts passing through said bearings, sprockets on said shafts, and chains engaging said sprockets and disposed alternately at opposite sides of the grid; sleeves around said shafts and rotatable in said bearings, said sleeves having non-circular interiors which increase in diameter from the centers of said sleeves to the ends thereof, the centers of said sleeves engaging the shafts to be driven thereby.

In testimony whereof I have hereunto affixed my signature.

ALBERT LAURITZEN.